United States Patent
Halford

(10) Patent No.: US 7,797,975 B2
(45) Date of Patent: Sep. 21, 2010

(54) TOOLING SYSTEM

(75) Inventor: Ben John Halford, South Luffenham (GB)

(73) Assignee: Surface Generation Ltd, Peterborough (GB)

( * ) Notice: Subject to any disclaimer, the term of this patent is extended or adjusted under 35 U.S.C. 154(b) by 494 days.

(21) Appl. No.: 11/721,671

(22) PCT Filed: Dec. 22, 2005

(86) PCT No.: PCT/GB2005/004987

§ 371 (c)(1), (2), (4) Date: Aug. 21, 2007

(87) PCT Pub. No.: WO2006/067447

PCT Pub. Date: Jun. 29, 2006

(65) Prior Publication Data

US 2009/0250857 A1    Oct. 8, 2009

(30) Foreign Application Priority Data

Dec. 24, 2004  (GB) ................................. 0428339.6

(51) Int. Cl.
*B21C 51/00*   (2006.01)

(52) U.S. Cl. .................... 72/15.3; 72/15.1; 72/17.3; 72/462; 72/481.1; 700/175; 269/277

(58) Field of Classification Search ............... 72/15.1, 72/15.3, 16.2, 16.3, 16.4, 17.3, 18.2, 342.1, 72/342.2, 342.3, 342.4, 403, 412, 413, 454, 72/462, 446, 476, 478, 481.1, 481.3; 269/265, 269/266, 277; 451/914; 700/175, 192

See application file for complete search history.

(56) References Cited

U.S. PATENT DOCUMENTS

| 1,826,783 | A | * | 10/1931 | Hess ........................... 72/413 |
| 2,056,491 | A | * | 10/1936 | Stimson ...................... 451/365 |
| 2,280,359 | A | * | 4/1942 | Trudell ......................... 72/60 |
| 5,796,620 | A | * | 8/1998 | Laskowski et al. .......... 700/197 |
| 6,089,061 | A | * | 7/2000 | Haas et al. ................... 72/14.8 |
| 6,498,962 | B2 | * | 12/2002 | Sugiyama et al. .......... 700/179 |
| 7,044,373 | B1 | * | 5/2006 | Garber et al. ............... 235/385 |
| 7,118,028 | B2 | * | 10/2006 | Liu et al. .................... 235/375 |
| 7,125,010 | B2 | * | 10/2006 | Moore et al. ................ 269/266 |

FOREIGN PATENT DOCUMENTS

WO          02/064308       *   8/2002

* cited by examiner

*Primary Examiner*—Edward Tolan
(74) *Attorney, Agent, or Firm*—Young Law Firm, P.C.

(57) ABSTRACT

An element (10) for use in a tooling system which comprises a plurality of elements arranged in an array, the elements of the array being movable between a closed position in which the elements contact one another and are secured in position, and an open position in which the elements of the array are spaced apart and are capable of vertical movement relative to one another is characterized in that the element comprises tagging means (8) providing the element with a unique identifier. The tagging means preferably comprises a radio frequency identification (RFID) tag.

28 Claims, 6 Drawing Sheets

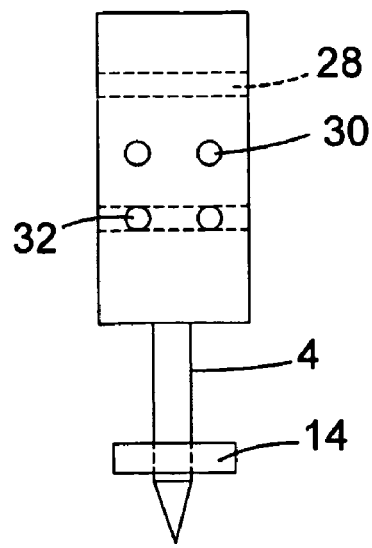
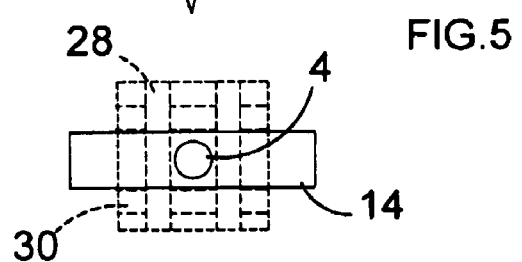
FIG.5
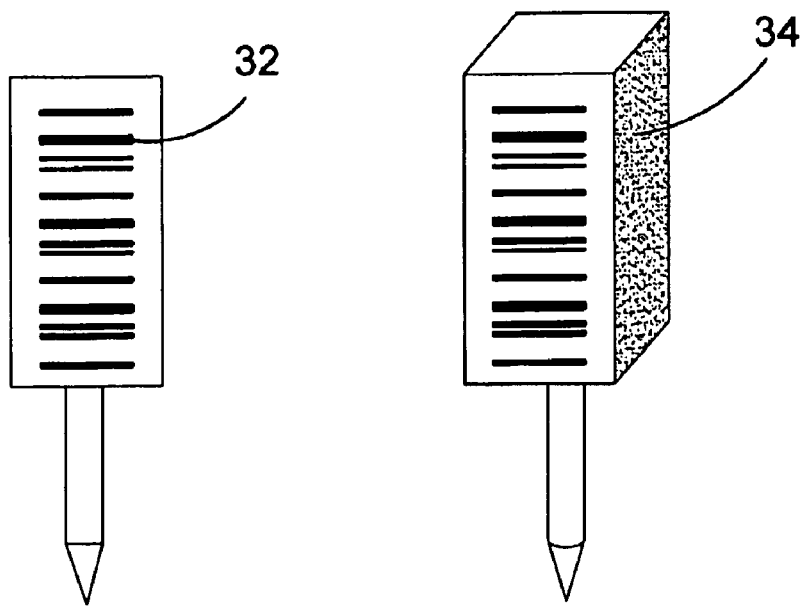
FIG.6  FIG.7

TOOLING SYSTEM

The present invention relates to an improved component for use in a tooling system, and to an improved tooling system including this component.

The improved component is particularly suitable for use in the tooling systems described and claimed in International Patent Application No. WO 02/064308.

International Patent Application No. WO 02/064308 describes and claims a tooling system comprising a plurality of elements arranged in an array, each element being moveable longitudinally relative to the other elements in the array and having a first end, the system further comprising means to adjust the relative longitudinal positions of the elements such that the free ends of the elements define approximately a desired surface contour and means for retaining the elements in their adjusted positions, characterised in that: the first end of each element is provided on a machinable portion removably mounted to a base portion, the arrangement being such that the free ends of the elements can be machined to produce the desired surface contour.

International Patent Application No. WO 02/064308 further describes and claims a tooling system comprising a plurality of elements arranged in an array, the elements of the array being movable between a closed position in which the elements contact one another and are secured in position, and an open position in which the elements of the array are spaced apart and are capable of vertical movement relative to one another, and drive means for opening and closing the array. The elements are mounted on support rails to form the array.

It is an object of the present invention to provide an improved element for use in such an array. The present invention provides a tooling system which comprises a plurality of elements arranged in an array, the elements of the array being movable between a closed position in which the elements contact one another and are secured in position, and an open position in which the elements of the array are spaced apart and are capable of vertical movement relative to one another, characterised in that one or more of the elements in the array comprises tagging means providing the element with a unique identifier.

The present invention further provides an element for use in a tooling system which comprises a plurality of elements arranged in an array, the elements of the array being movable between a closed position in which the elements contact one another and are secured in position, and an open position in which the elements of the array are spaced apart and are capable of vertical movement relative to one another, characterised in that the element comprises tagging means providing the element with a unique identifier.

In a preferred embodiment of the invention, the tagging means may comprise a radio frequency identification (RFID) tag, which may be secured to the element by any suitable means, for example it may be mounted on the surface of the element or located within a pocket provided in the element.

Where the tagging means is an RFID tag, it is preferably inserted into the element during the manufacturing process.

In an alternative preferred embodiment of the invention, the tagging means may comprise a barcode imprinted upon a surface of the element.

One or more faces of the element may be coated with identifying visually readable identifiers, for example colour coding or other identifying markings.

The tagging means is preferably located on the element such that it can be scanned by an automatic reader, linked to a control system of the tooling system, either during assembly of the array and/or when the element is located within the assembled array. The reader is suitably located on the means for adjusting the relative longitudinal positions of the elements or may be located at a separate scanning station.

The elements according to the invention are preferably assembled onto cross rails, and are supplied either individually or in the form of a magazine or cartridge.

The elements according to the invention preferably terminate at their ends remote from the machinable portion in a tapered portion, preferably located adjacent to a threaded portion, which threaded portion is adapted to co-operate with a threaded hole in the cross rail.

In a further preferred embodiment of the invention, the elements are provided with internal heating elements, together with means for connecting the heating elements to a source of electrical power.

In a further preferred embodiment of the invention, the elements are provided with through holes which extend substantially parallel to the longitudinal axis of the element, which through holes, at their ends remote from the machinable portion, are adapted to be connected to a source of positive or negative pressure or may house an ejector.

In a further preferred embodiment of the invention, the elements are provided with a network of internal channels, which are adapted to be connected to a source of heating or coolant fluid.

The elements may also be provided with a sprue bush or one or more sensors.

In a further preferred embodiment of an element according to the invention, the element is provided with a telescopic support.

The elements according to the invention are preferably manufactured by a casting process in which the finished element with all the required component parts is formed in a single process.

The tooling system according to the invention preferably further comprises means for preventing the ingress of debris, in particular debris created by the machining of the machinable portion of the elements, into the areas of the system where the cross rails are located.

Where the elements according to the invention comprise a threaded portion, the tooling system according to the invention preferably further comprises means for cleaning the threaded portion as the element is adjusted, for example a cleaning membrane.

The tooling system according to the invention preferably further comprises a central control system which is used in conjunction with the tagging means to record the life history of the pin and to use this information on the life history to optimise the pin distribution in order to maximise pin utilisation.

The use of elements according to the invention comprising tagging means in a tooling system gives rise to a number of advantages.

In particular, it is possible for the operator to check pin orientation and the location of individual pins within the array against a database, and thus, inter alia, to ensure that materials used on each machine do not exceed the design limits of that particular system.

It is also possible for the operator to verify the type, size and geometry of an element in use i.e. making sure the machine tool does not 'crash'

It is also possible for the operator to verify that the heights of pins are as stored in the central control, again preventing crashes when the computer-aided manufacturing (CAM) stock file does not represent the pin approximation of the surface.

The provision of tagging means and a central control system allows the manufacturer or supplier of the tooling system to support the operator in a number of valuable ways, including:

Automatic re-stocking of consumable elements as the operator uses up stock.

An on-line or local billing per job costing system.

The supply of machines at low or no cost, with precise verification of the utilisation, to be charged on a usage basis.

The production of user specific statistics to help minimise operational costing.

The provision of on-line job quotation, by analysing the volume of material required rather than the specific geometry.

Shared on-line tool design which can be viewed between geographically separate sites.

A tooling system and an element according to the invention will now be described with reference to the following drawings, in which:

FIG. 5 is a side view and a plan view from below of a sixth embodiment of an element according to the invention (RFID not shown) comprising a network of channels;

FIG. 6 is a side view of a seventh embodiment of an element according to the invention having a barcode;

FIG. 7 is a side view of a eighth embodiment of an element according to the invention having a barcode and a colour coded side face;

Figure 1A:
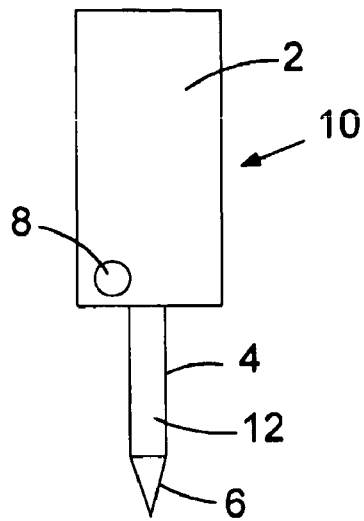
FIG. 1a is a side view of a first embodiment of an element according to the invention having an RFID tag located in a pocket.
Figure 1B:
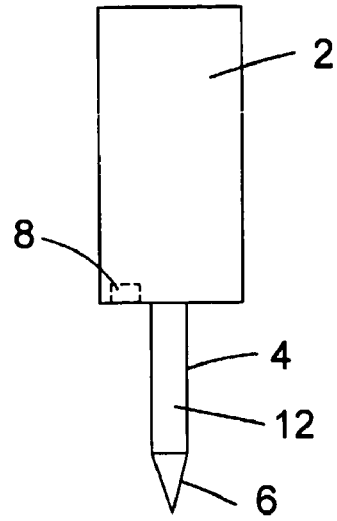
FIG. 1b is a side view of a second embodiment of an element according to the invention having an RFID tag located in a pocket.

As can be seen in FIG. 1a, an element shown generally at 10 comprises a machinable pin portion 2, a support portion 4 and a tapered portion 6. An RFID tag 8 is mounted within the pin portion 2, flush with a side wall thereof. The straight portion of the support portion 4 terminates adjacent to the tapered portion 6 in a threaded portion 12.

Figure 1D:
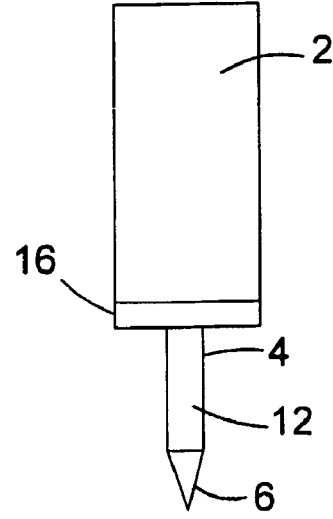
FIG. 1d is a side view of a third embodiment of an element according to the invention having an RFID tag located in a pocket.
Figure 1C:
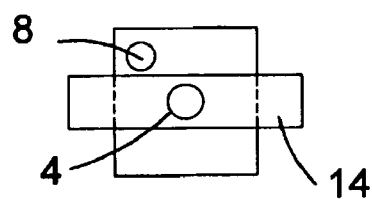
FIG. 1c is a plan view from below of an element of FIG. 1b mounted in a cross rail.

In the alternative embodiment shown in FIGS. 1a and 1c, the RFID tag 8 is mounted within the base of pin 2 and is visible on that base, as can be seen from FIG. 1c, which shows the element 10 mounted on a cross rail 14.

In the alternative embodiment shown in FIG. 1d, a pocket 16 for an RFID tag is provided at the base of pin 2.

Figure 2:
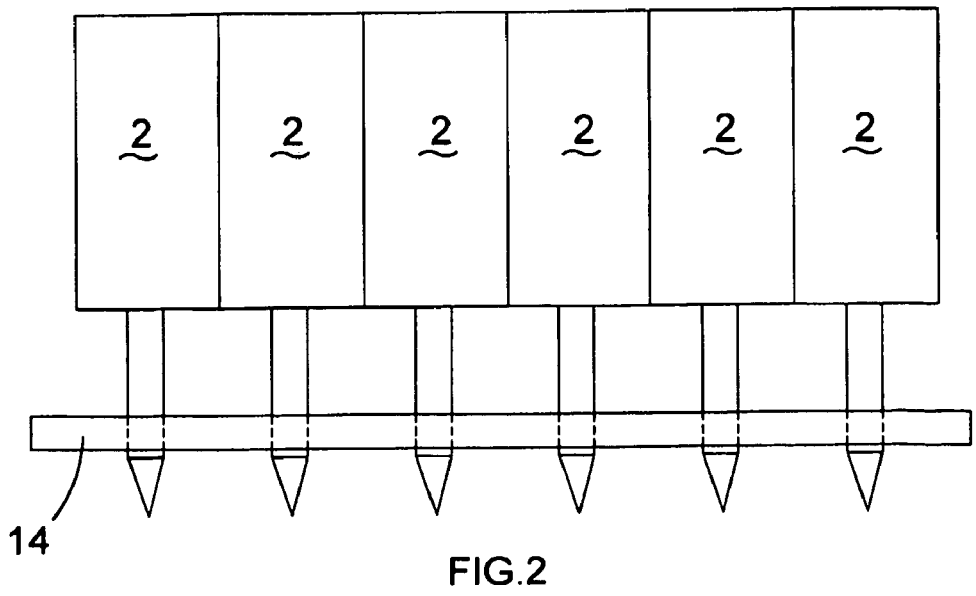
FIG. 2 is a side view of a plurality of elements (RFID not shown) according to the invention supplied as a magazine.

The elements according to the invention may be provided in a magazine, which as shown in FIG. 2 have been loaded on to a cross rail 14.

Figure 3:
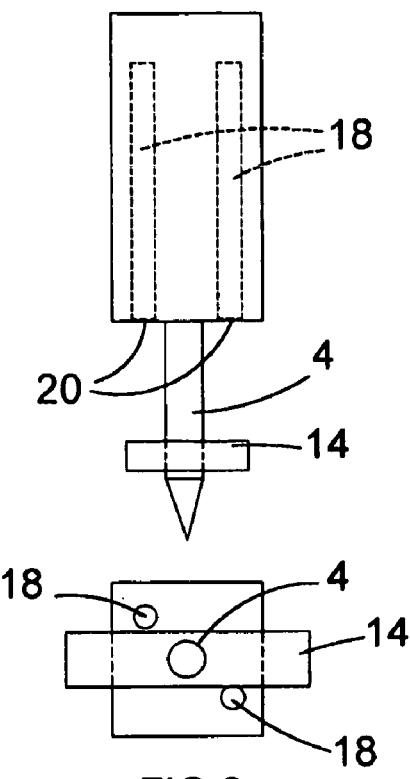
FIG. 3 is a side view and a plan view from below of a fourth embodiment of an element according to the invention (RFID not shown) comprising a heater.

FIG. 3 shows an alternative embodiment of an element according to the invention, which is provided with an internal heater 18 which can be connected by means of connectors 20 to a source of electrical power. The RFID tag is not shown.

Figure 4:
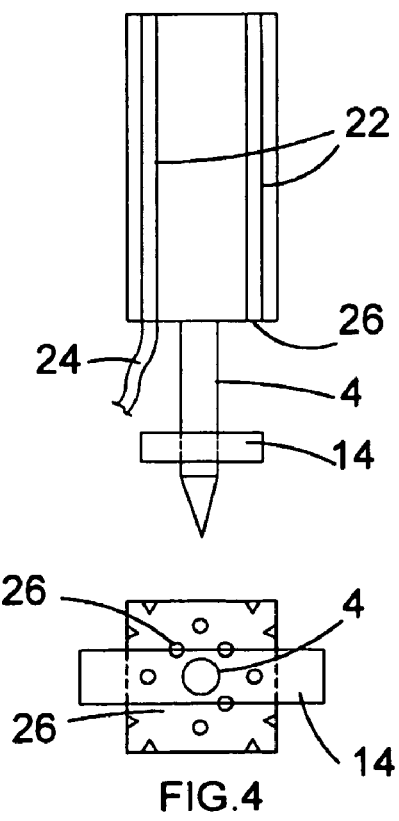
FIG. 4 is a side view and a plan view from below of a fifth embodiment of an element according to the invention (RFID not shown) comprising through holes and side channels.

FIG. 4 shows an alternative embodiment of an element according to the invention, which is provided with through holes and grooves 22 terminating in open vents 26, which can be connected to a pipe 24 connected to a source of positive or negative pressure. The RFID tag is not shown.

FIG. 5 shows a further alternative embodiment of an element according to the invention, which is provided with a network of offset channels 28, 30, 32 through which a heating or coolant fluid can be pumped. The RFID tag is not shown.

FIG. 6 shows a further alternative embodiment of an element according to the invention, in which the unique identifier is provided by means of a barcode 32 imprinted on a side wall of the pin portion of the element. The barcode also provides height registration as the element is consumed. The embodiment shown in FIG. 7 further includes a coloured face 34, which allows the operator to carry out a visual inspection to ensure that all of the elements in an array are correctly aligned.

Figure 8A:
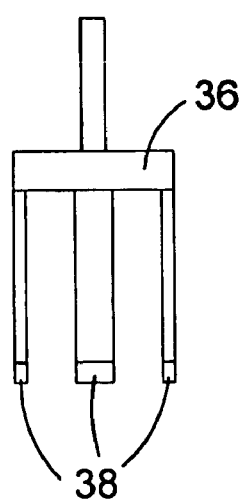
FIGS. 8a and 8b are side views of alternative designs of a means for adjusting the relative longitudinal positions of the elements, fitted with a reader for an RFD tag.
Figure 8B:
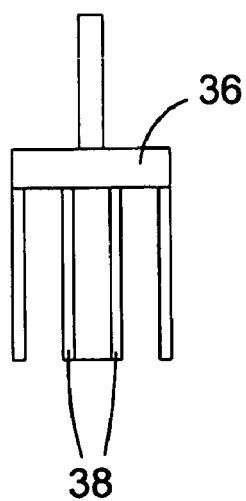

In FIGS. 8a and 8b, alternative designs for means for adjusting the relative longitudinal positions of the elements, in the form of a fork 36 are shown. The tines of the fork 36 are provided with a plurality of scanning heads 38 which may be located at the tips of the tines as in FIG. 8a, or along the length of one or more tines as shown in FIG. 8b, for scanning the RFID tags 8 mounted on the array elements 10.

Figure 9:
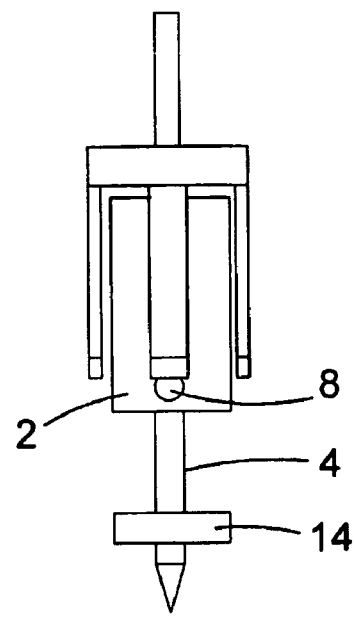
FIG. 9 is a side view of the means of FIG. 8a with an element according to FIG. 1a retained therein for adjustment.

The fork of FIG. 8a is shown in use with an element 10 in FIG. 9.

Figure 10:
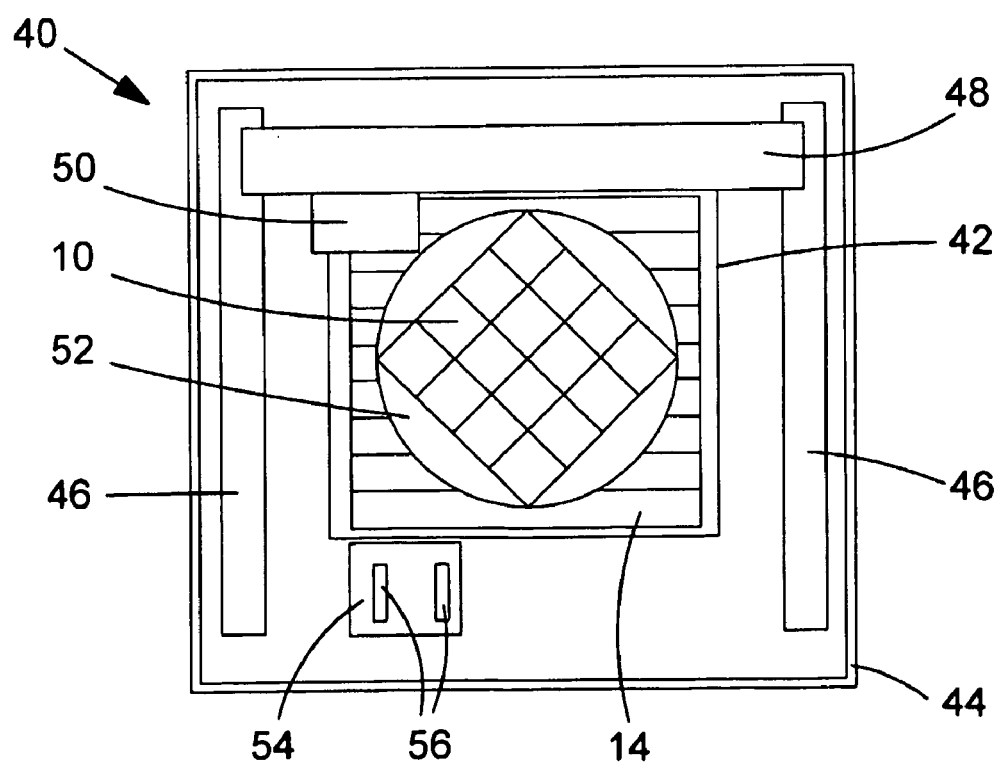
FIG. 10 is a plan view of a tooling system including an RFID scanning station.

An RFD pin scanning station is shown in FIG. 10. A tooling system shown generally at 40 comprises a consumable module 42 and a driver module 44. The consumable module 42 comprises a plurality of elements 10 supported by an array of cross rails 14 and retained by a bolster means 52. The X-axis and Y-axis are shown respectively at 46 and 48 and the Z-(or fork) axis is shown at 50. A scanning station shown generally at 54 comprises scanning antennae 56.

The process flow of the RFID pin scanning station shown in FIG. 10 is as follows:

RFID pin scanning station - process flow

thread cleaner 1108 in the form of a cleaning blade or disk is located on the cross rail 1104 and serves to clean the thread of the threaded bar as the element is raised or lowered.

Figure 12:
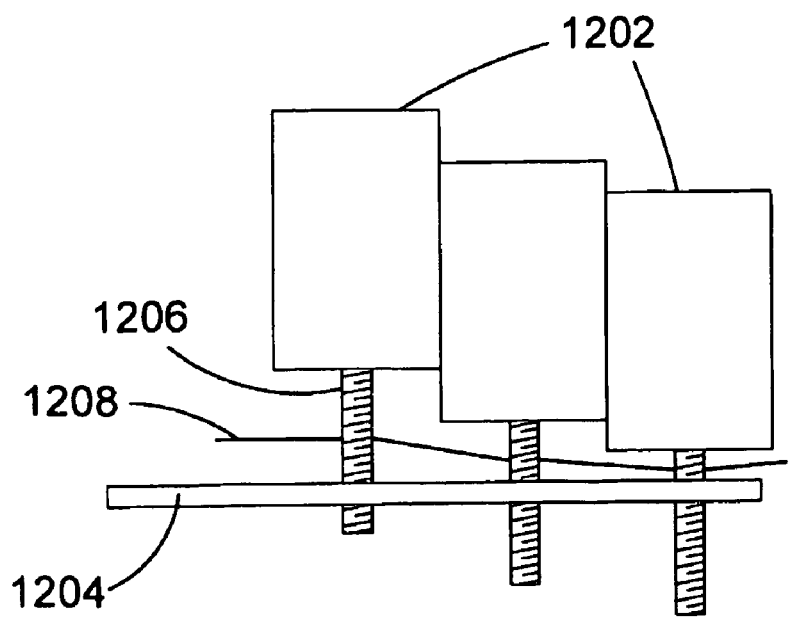
FIG. 12 is a side view of an embodiment of a tooling system according to the invention which further comprises means for preventing the ingress of debris into the areas of the system where the cross rails are located.

The tooling system according to the invention as shown in FIG. 12 comprises a plurality of elements 1202 mounted on a cross rail 1204 by means of threaded bar supports 1206. A membrane 1208 covers the whole area of the bed of the consumable module, above the cross rails to prevent the ingress of debris into the area of the tooling system where the cross rails are located. The membrane 1208 is suitably pleated in order to allow for the relative movement of the cross rails.

Figure 13:
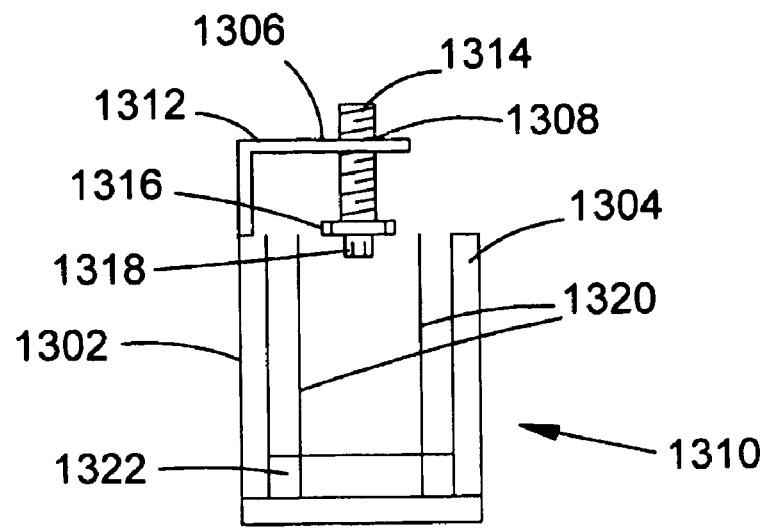
FIG. 13 is a side view of a casting jig in which a finished element with all its required component parts may be formed in a single process and FIG. 14 is a side view and a plan view from below of an element according to the invention provided with a telescopic support.

The casting jig for the manufacture of elements according to the invention as shown in FIG. 13 is shown generally at 1310 and comprises an open mould 1302 above an upper wall 1304 of which is mounted a support jig 1306. A through aperture 1308 is provided in a horizontal arm 1312 of the jig 1306, for receiving a threaded bar support 1314. A locking nut 1316 is located close to the lower end of the threaded bar support 1314. The threaded bar support 1314 terminates at its lower end in a grooved locking section 1318. In operation, the

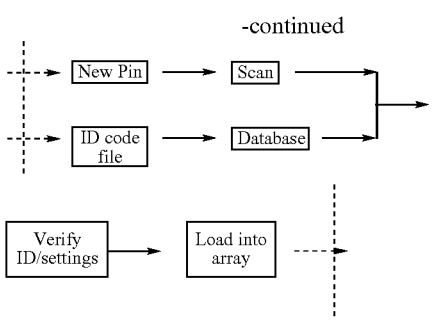

The process flow of the RFID pin scanning fork shown in FIGS. 8 and 9 is as follows:

RFID pin scanning fork - process flow

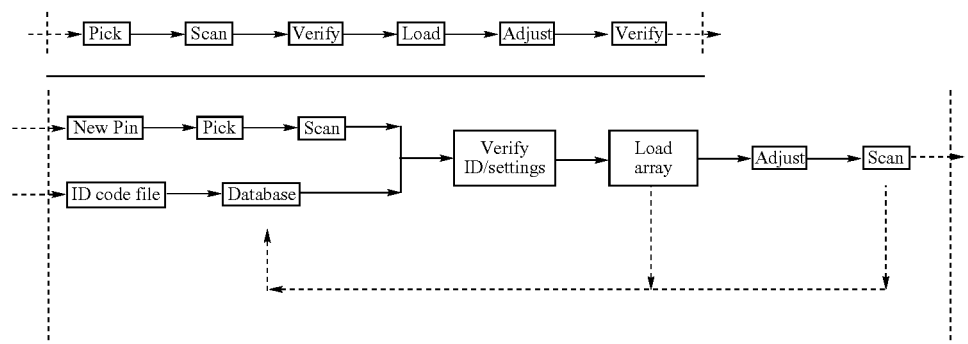

The RFID pin-process flow is as follows:

RFID pin - process flow

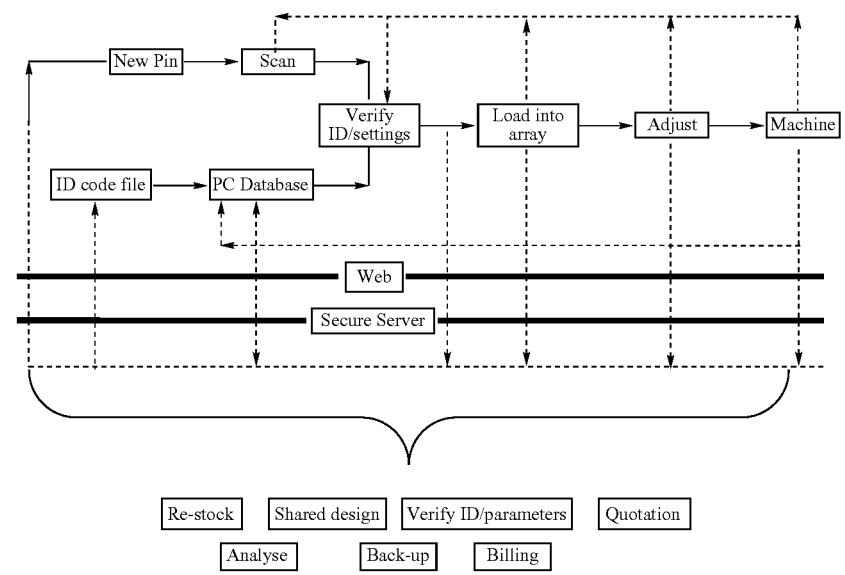

Figure 11:
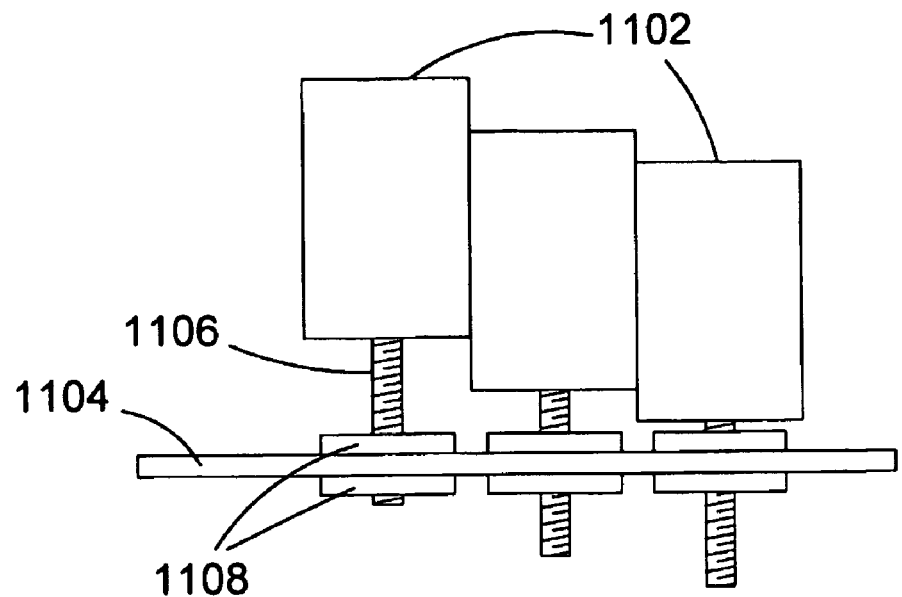
FIG. 11 is a side view of an embodiment of a tooling system according to the invention which further comprises means for preventing the ingress of debris into the threads of the array elements.

The tooling system according to the invention as shown in FIG. 11 comprises a plurality of elements 1102 mounted on a cross rail 1104 by means of threaded bar supports 1106. A threaded bar support 1314 is mounted on the support jig 1306 with the lower end of the threaded bar support 1314 extending into the mould 1302. In the Example shown in FIG. 13, a plurality of dowels 1320 are located vertically within the mould 1302. Resin 1322 is supplied into the mould 1302 in a known manner until the desired level is reached. The resin is then allowed to set and the dowels removed and the cast element is removed from the mould 1302. The function of the locking nut 1316 and grooved locking section 1318 is to prevent separation of the support 1314 and the moulded portion when the element is assembled in the tooling system and is adjusted vertically.

It will be appreciated that other required elements, such as an RFID tag, one or more heating elements and/or one or more other mould cores may be incorporated in the moulding process.

Figure 14:
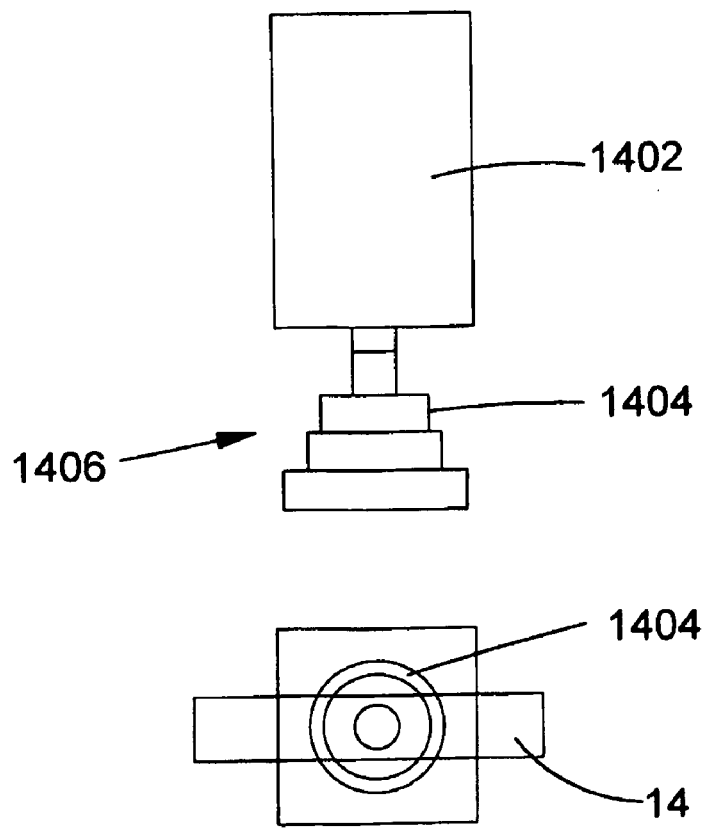

The element according to the invention shown in FIG. 14 comprises an element 1402 supported on a cross rail 14 by means of a telescopic support 1404 for height adjustment. The telescopic support 1404 comprises a series of alternately left and right handed threaded concentrically disposed elements.

The invention claimed is:

1. An element for use in a tooling system which comprises a plurality of elements arranged in an array, the elements of the array being movable between a closed position in which the elements contact one another and are secured in position, and an open position in which the elements of the array are spaced apart and are capable of vertical movement relative to one another, wherein the element includes a tag that is configured to provide the element with a unique identifier and information identifying a rotational orientation and location of the element within the array.

2. An element according to claim 1, wherein the tag is offset from a center of the element.

3. An element according to claim 1, wherein the tag is provided on a surface of the element.

4. An element according to claim 1, wherein the element includes a machinable portion, and wherein the tag is configured to provide information identifying a three-dimensional surface geometry of the machinable portion of the element.

5. An element according to claim 1, wherein the tag is configured to provide information identifying a height of the element within the array.

6. An element according to claim 1, wherein the tag includes a radio frequency identification (RFID) tag.

7. An element according to claim 6, wherein the element defines a pocket configured to receive the RFID tag.

8. An element according to claim 1, wherein the element is configured such that the tag is inserted into the element during a manufacturing thereof.

9. An element according to claim 1, wherein the tag includes a barcode imprinted upon a surface of the element.

10. An element according to claim 1, wherein at least one face of the element is coated with an identifying visually readable identifier.

11. An element according to claim 10, wherein the identifying visually readable identifier includes at least one of color coding and other identifying markings.

12. An element according to claim 1, wherein the tag is located on the element such that it is scannable by an automatic reader, linked to a control system of the tooling system, at least one of during assembly of the array and when the element is located within the assembled array.

13. An element according to claim 4, wherein the element terminates at an end remote from the machinable portion in a tapered portion.

14. An element according to claim 13, wherein the tapered portion is located adjacent to a threaded portion, which threaded portion is adapted to co-operate with a threaded hole in a cross rail of the array.

15. An element according to claim 1, further comprising internal heating elements, together with means for connecting the heating element to a source of electrical power.

16. An element according to claim 4, further defining a through hole which extends substantially parallel to a longitudinal axis of the element, which through hole, at its end remote from the machinable portion, is one of configured to be connected to a source of positive or negative pressure and houses an ejector.

17. An element according to claim 1, further comprising a network of internal cooling or heating channels, which are adapted to be connected to a source of coolant fluid.

18. An element according to claim 1, further comprising at least one of a sprue bush and one or more sensors.

19. An element according to claim 1, wherein the element is manufactured by a casting process in which the element with all required component parts is formed in a single process.

20. An element according to claim 1, further comprising a telescopic support.

21. A tooling system which comprises a plurality of elements arranged in an array, the elements of the array being movable between a closed position in which the elements contact one another and are secured in position, and an open position in which the elements of the array are spaced apart and are capable of vertical movement relative to one another, wherein at least one of the elements in the array includes an element as claimed in claim 1.

22. A tooling system as claimed in claim 21, wherein the array further includes cross rails and means for preventing ingress of debris into the areas of the system where the cross rails are located.

23. A tooling system as claimed in claim 21, wherein the elements include a threaded portion, which further includes means for cleaning the threaded portion as the element is adjusted.

24. A tooling system as claimed in claim 21, further comprising a central control system which is used in conjunction with the tag to record a life history of the element.

25. A tooling system as claimed in claim 24, wherein the central control system is located within the tooling system.

26. A tooling system as claimed in claim 24, wherein the central control system is located remote from the tooling system.

27. A tooling system as claimed in claim 24, wherein the information on the life history is used to optimise pin distribution in order to maximise pin utilisation.

28. A tooling system as claimed in claim 21, further comprising a reader for reading the tag which is located on the means for adjusting the relative longitudinal positions of the elements.

* * * * *